(12) United States Patent
Uchiyama

(10) Patent No.: US 6,987,988 B2
(45) Date of Patent: *Jan. 17, 2006

(54) CORDLESS AND WIRELESS TELEPHONE DOCKING STATION WITH LAND LINE INTERFACE AND SWITCHING MODE

(75) Inventor: Koji Uchiyama, Plantation, FL (US)

(73) Assignee: Waxess, Inc., Irvine, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 09/991,296

(22) Filed: Oct. 22, 2001

(65) Prior Publication Data

US 2003/0078071 A1    Apr. 24, 2003

(51) Int. Cl.
*H04B 1/38* (2006.01)
*H04M 1/00* (2006.01)

(52) U.S. Cl. .............. 455/557; 455/562; 455/565; 455/566

(58) Field of Classification Search ........... 455/462, 455/465, 554, 555, 556.1, 556.2, 557, 562, 455/565, 566
See application file for complete search history.

(56) References Cited

U.S. PATENT DOCUMENTS

| | | | | |
|---|---|---|---|---|
| 5,309,502 A | * | 5/1994 | Hirai | 455/426.1 |
| 5,884,191 A | * | 3/1999 | Karpus et al. | 455/557 |
| 5,915,224 A | * | 6/1999 | Jonsson | 455/552.1 |
| 5,991,640 A | * | 11/1999 | Lilja et al. | 455/557 |
| 6,240,297 B1 | * | 5/2001 | Jadoul | 455/466 |
| 6,253,088 B1 | * | 6/2001 | Wenk et al. | 455/462 |
| 6,266,539 B1 | * | 7/2001 | Pardo | 455/556.2 |
| 6,343,220 B1 | * | 1/2002 | Van Der Salm | 455/552.1 |
| 6,466,799 B1 | * | 10/2002 | Torrey et al. | 455/462 |
| 6,556,826 B1 | * | 4/2003 | Johnson et al. | 455/426.1 |
| 6,704,580 B1 | * | 3/2004 | Fintel | 455/550.1 |
| 6,766,175 B2 | * | 7/2004 | Uchiyama | 455/462 |
| 2002/0086703 A1 | * | 7/2002 | Dimenstein et al. | 455/557 |
| 2002/0106993 A1 | * | 8/2002 | Shealtiel | 455/74.1 |
| 2002/0160791 A1 | * | 10/2002 | Markowitz | 455/462 |

\* cited by examiner

*Primary Examiner*—Curtis Kuntz
*Assistant Examiner*—Tuan Pham
(74) *Attorney, Agent, or Firm*—Dan Brown Law Office; Daniel R. Brown

(57) ABSTRACT

A telephone docking station that combines the operation of a wireless telephone, a cordless telephone, and a land-line telephone interface is taught. The wireless telephone and land-line interface provide telephone resources to the cordless telephone, which functions as a telephone terminal unit. Telephone calls can originate or terminate from either telephone resource. The cordless telephone handset provides for selection and display of the presently connected telephone resource. Caller ID information from both resources are routed to the cordless telephone. The cordless telephone automatically answers the presently ringing resource when is received. A speakerphone and an answering machine are added as alternative telephone terminal units in an illustrative embodiment. A Caller ID preview and hold function is provided so that the user can manage multiple calls from the telephone resources.

10 Claims, 6 Drawing Sheets

CORDLESS AND WIRELESS TELEPHONE DOCKING STATION WITH LAND LINE INTERFACE AND SWITCHING MODE

BACKGROUND OF THE INVENTION

1. Field of the Invention

The present invention relates to telephony. More specifically, the present invention relates to integrated cordless and wireless telephones having a landline interface.

2. Description of the Related Art

Cordless telephones are similar to conventional corded telephones in that they are connected by wire to a local central office. However, they differ in that there is no cord between the base unit of the cordless telephone and the handset; thus, they are termed 'cordless' telephones. Cordless telephones add the convenience of mobility within the range of coverage of radio transceivers in the cordless telephone base unit and handset.

The deployment of cellular service established the beginning of a wireless telephony era. The first widely adopted and implemented standard in the United States was AMPS cellular. Later, other standards were implemented, including TDMA (IS-136), CDMA (IS-95), GSM, PCS (various standards), and others. All of the wireless telephones developed according to these standards share the characteristic that there is no local metallic loop employed to render service. Rather, a wireless telephone network is deployed by a service provider, and wide area coverage (at least respecting the coverage of a cordless telephone) is delivered via radio signals from a plurality of radio cell cites. The wireless telephones do not typically comprise a base unit; rather, the entire telephone circuitry is contained inside a single enclosure, including a battery.

Wireless telephones do suffer from certain disadvantages. They are physically small, and hence the user interface is rather compact, which somewhat reduces the convenience of operation. The transmitter power is controlled and kept low to conserve battery power. And, received signal strengths are low, due to frequency reuse plans and other network infrastructure considerations. This means that radio signal strength is often time so limited that interference and noise are prevalent and common annoyances during communications. The mobility of the wireless transceiver exacerbates the interference and noise problems because of the vagaries of radio propagation, including multi-path interference, Rayleigh fading, and physical blocking of radio signal paths. In addition, wireless telephones have limited battery life, especially during extended conversation times.

Cordless telephones offer improved user interfaces and performance over wireless telephones in most circumstances. Cordless telephones are usually larger and have more complete and convenient user interfaces. Cordless base units often times house voice messaging systems and/or speakerphones. Cordless telephones operate in small geographic areas so that signal levels at the receivers of both the base unit and handset are high, offering better receiver quieting, higher signal to noise ratios, and less interference and noise generally. They also offer longer battery life during both standby and talk times, owing to their larger batteries and their more extended times at rest on a charging cradle.

With the advent of the wireless era, the trend is toward using the wireless telephone as a principal telephone resource, even as compared to the traditional wired and corded telephones, which are coupled to the telephone network through a landline metallic conductor pair interfaced to a local central office. Users merely keep their wireless telephone with them at all times, whether during travel, at home, or at work. Thus, they are readily reachable by calling the wireless telephone number. However, this means that the aforementioned limitations of wireless telephones are always present for such users. It is known in the art to overcome these limitations by integrating a cordless base unit and handset with a wireless telephone interface such that the wireless telephone can act as the telephone service resource to the cordless telephone. Such a systems is described in a co-pending U.S. patent application filed on Dec. 13, 2000, assigned U.S. Patent Office Ser. No. 09/737, 289, entitled CORDLESS AND WIRELESS TELEPHONE DOCKING STATION, invented by Uchiyama, who is the inventor of the present application. This approach provides the advantages of the cordless telephone device while utilizing a telephone resource accessed through a wireless telephone network. Such a device is referred to as a cordless and wireless telephone docking station.

A limitation exists in the utilization of the cordless and wireless docking station in that while the wireless telephone is removed from the docking station, the cordless portion that remains is not usable because there is no telephone resource available in the absence of the wireless telephone. Yet, many homes and offices have access to both wireless and landline telephone resources. This means that users of the cordless and wireless docking station require the use of two telephone terminal devices, one coupled to the landline services and the other coupled to the wireless telephone resource in order to access both telephone service resources.

Thus, there is a need in the art for an apparatus to consolidate landline and wireless telephone resources into a single device having cordless capability.

SUMMARY OF THE INVENTION

The need in the art is addressed by the present invention. An illustrative embodiment teaches a telephone docking station for coupling signals among a wireless telephone, a cordless telephone handset and a metallic telephone line. The docking station includes a multiple port telephone switch and a wireless telephone interface that receives the wireless telephone couples wireless signals with a first port on the switch, the wireless telephone interface has an output state that indicates the presence of the wireless telephone. The docking station also includes a cordless telephone base unit that has a radio transceiver adapted to communicate with the cordless telephone handset and that couples cordless signals with a second port on the switch, and a telephone line interface for a the metallic telephone line that couples line signals with a third port on the switch. The docking station has a controller coupled to the output, and coupled to control the switch to connect the first port or the second port to the third port as a function of the state of the output.

In a refinement of the foregoing docking station, the controller controls the switch to connect the first port to the second port if the wireless telephone interface output state indicates that the wireless telephone is present, or, the controller controls the switch to connect the third port to the second port if the output state indicates that the wireless telephone is not present. In another refinement, the docking station further includes an actuator coupled to the controller, and wherein the controller controls the switch to connect either of the first port or the third port to the second port in accordance with actuation of the actuator. In a further refinement, the docking station also includes a display indicator for indicating which of the ports are connected in the switch, and the controller is coupled to drive the display indicator in accordance with the current connection state of the switch.

The present invention docking station further improves on its advancement with a cordless handset that operates to communicate data signals with the cordless telephone base unit, the cordless handset having an actuator that operates to encode a control signal in the data signals in response to actuation of the actuator. And, the radio transceiver is coupled to receive the control signal from the cordless handset and operates to communicate the control signal to the controller, so that the controller controls the switch to connect either of the first port or the third port to the second port in accordance with the control signal. In a refinement of this, the cordless handset further includes a display indicator for indicating which of the ports are connected in the switch, and the controller operates to generate a switch state signal within the data signals and cause the cordless telephone base unit to communicate the switch state signal to the cordless handset. Thus, the cordless handset operates to drive the display in accordance with the switch state signal. In another refinement, a display is disposed within the cordless handset having a Caller ID display portion and a call indicator for indicating the source of a telephone call. The controller then operates to receive Caller ID data from either of the wireless telephone interface adapter or the telephone line interface, and operates to couple the Caller ID data together with data indicative of the source of the Caller ID data to the cordless telephone base unit for communications thereof to the cordless handset for display of the Caller ID data on the display and for activation of the call indicator indicative of the source of the Caller ID data. In yet another refinement of this, a second actuator is disposed upon the cordless handset for answering an incoming call. Actuation of the second actuator causes the cordless handset to communicate an answer signal to the cordless telephone base unit that couples the answer signal to the controller. Thus, the controller operates to cause the multiple port switch to coupled to presently ringing one of the wireless telephone interface or the telephone line interface to the second port in response to the answer signal.

In another improvement of the present invention, the docking station further includes a speakerphone adapted to couple speakerphone signals with a fourth port on the switch. Also, an actuator coupled to the controller for selecting a speakerphone function. Selection of the speakerphone function causes the controller to control the switch to connect the fourth port in place of the second port, thereby connecting the presently connected one of the wireless signals or the line signals to the speakerphone signals. In another improvement, the docking station includes an answering machine adapted to couple answering machine signals with a fourth port on the switch. And, the controller operates to control the switch to connect either of the first port or the third port to the fourth port upon receipt of an answering machine command identifying which of the first of third ports are to be coupled to the fourth port. In a refinement of this advancement, the controller operates to produce the answering machine command indicating that the first port is to be coupled to the fourth port if the cordless telephone base unit is presently engaged in a telephone call. Or, the controller operates to produce the answering machine command indicating that the third port is to be coupled to the fourth port if the wireless telephone interface is presently engaged in a telephone call.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
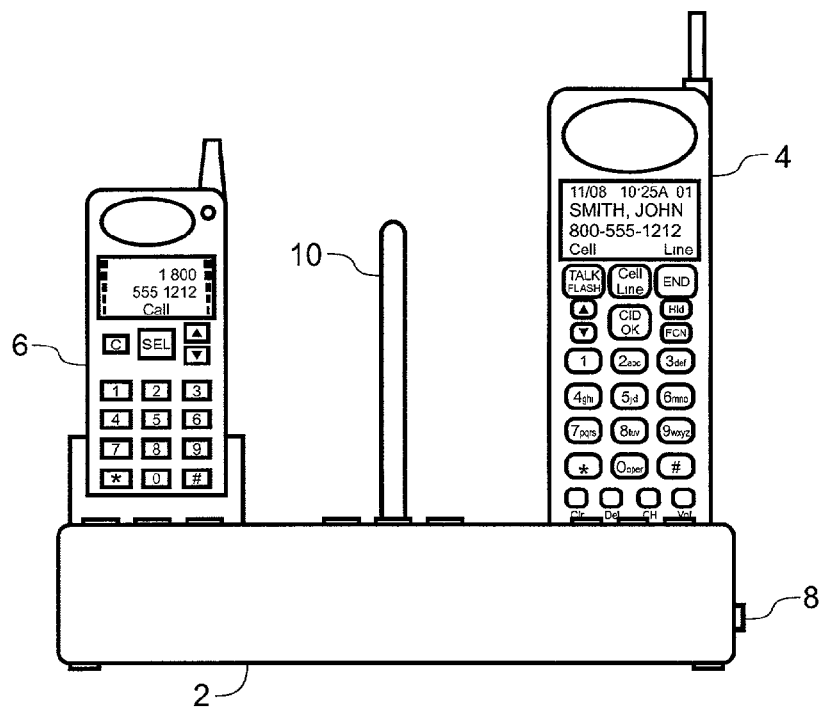
FIG. 1 is a drawing of a docking station according to an illustrative embodiment of the present invention.

Reference is directed to FIG. 1, which is drawing of an illustrative embodiment cordless and wireless telephone docking station according to the present invention. The docking station 2 accepts a cordless telephone 4 and a wireless telephone 6 (also referred to as a "cellular telephone"). The wireless telephone 6 and cordless telephone 4 rest in cradles on the docking station 2. While the illustrative embodiment illustrated in FIG. 1 shows that the wireless telephone 6 and cordless telephone 4 rest in a vertical position, it is to be understood that a horizontal position could also be employed. In fact, any cradle arrangement, as are understood by those of ordinary skill in the art could be utilized with respect to the present invention. The cradles in the docking station 2 are adapted to mechanically and electrically couple to the cordless telephone 4. Therefore, by implementing a variety of cradle configurations, a wide variety of wireless and cordless telephone interface architectures can be accommodated. The wireless telephone implemented in accordance with the teachings of the present invention may be of any of the presently available wireless telephone technologies, including but not limited to AMPS cellular, TDMA cellular, CDMA cellular, PCS, GSM, or other US or international standards, or private systems, or, may be adapted for yet to be released or developed wireless telephone systems and standards, throughout the world.

The docking station 2 has an antenna 10 that is used to communicate with the cordless telephone handset 4 via radio waves. Radio communications enable the cordless telephone 4 to operate in the vicinity of the docking station 2 without the user being tethered by a cord coupled to the handset. The docking station 2 also includes an RJ-11 telephone jack 8 that provides a metallic interface to a public or private telephone systems or network. Either of the wireless telephone 6 and the RJ-11 jack 8 enables an interface to the Public Switched Telephone Network ("PSTN") and are therefore telephone resources to the docking station 2. The docking station 2 is functional with either one or both of the telephone resources available. The cordless telephone 4 serves the function of a telephone network terminal unit, which provides the ear and mouth interface to a user, as well as a variety of other telephony services and features. Within the docking station 2, a cordless telephone transceiver unit (not shown) is coupled to the wireless telephone 6 through the wireless telephone cradle (not shown). During a telephone call, and for other telephone operations, either of the wireless telephone 6 or the RJ-11 interface 8 are interconnected to the cordless telephone 6. Thus, the user of the present invention will have all of the advantages of a conventional cordless telephone without the requirement for wire-line service, and without the disadvantages generally associated with a wireless telephone. Yet, a wire-line interface is available so that dual telephone resources can be coupled to the docking station 2.

The illustrative embodiments taught herein are with respect to a single cordless telephone 4 interconnected to a wireless telephone 6 and/or a single wire-line interface 8. The cordless telephone has a feature set commensurate with the contemporary state of the cordless telephone art. However, the principle interface is between the wireless telephone or the wire-line interface and the cordless telephone base transceiver circuitry. The ultimate interconnection to the cordless telephone handset is via radio waves. Therefore, it will be readily apparent to those of ordinary skill in the art that all of the features and capabilities understood as applicable to cordless telephony generally, whether presently understood or later developed, are equally applicable to the present invention. Thus, for example, a cordless telephone employing multiple handsets, each uniquely identified, could communication with the present invention docking station, as well as with one another. It is the novel interconnection to the public switched telephone network and/or a wire-line telephone system, through the docking station according to the present invention, and the wireless telephone that is the essence of the advancement in the art.

Another added measure a convenience is obtained by providing a power supply (not shown) in the docking station 2, which draws power from conventional sources. The power supply provides operating power to the docking station 2 during normal operation. It also provides a source of current for recharging the rechargeable batteries in both of the cordless telephone 4 and the wireless telephone 6. Without the use of the present invention, the user of a wireless telephone would require another means of recharging the batteries in the wireless phone. Since a user of the present invention will place the wireless telephone 6 in the cradle of the docking station 2 during extended periods of time when the wireless telephone 6 is used as a telephone resource, the ability to charge the batteries of the wireless telephone 6 with the present invention advantageously eliminates the need for an independent wireless telephone charging apparatus.

Figure 2:
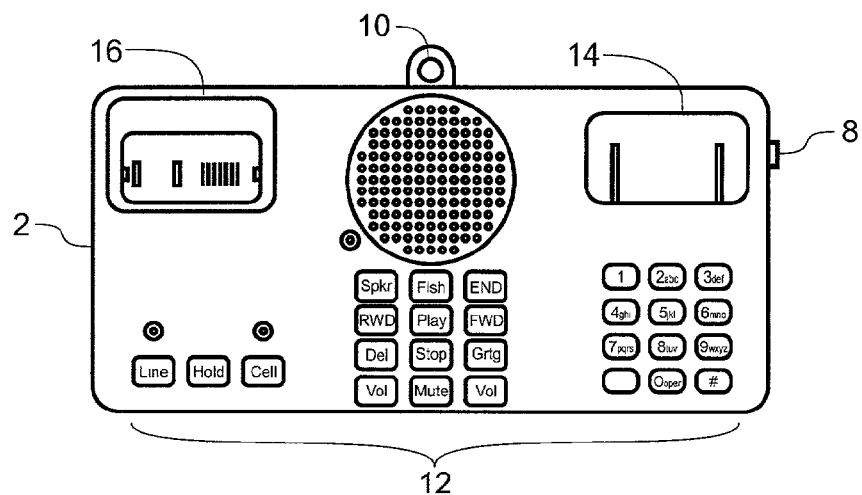
FIG. 2 is a drawing of the base unit in an illustrative embodiment of the present invention.

Reference is directed to FIG. 2, which is a drawing of the user interface of the docking station 2 in an illustrative embodiment of the present invention. The wireless telephone and cordless telephone do not appear in this FIG. 2. The docking station 2 includes a case that is fabricated from plastic in the illustrative embodiment, but could be made from any suitable material. The docking station 2 also includes a cordless telephone cradle 14 which is primarily a mechanical interface used to support the cordless telephone (not shown) while it is resting and not in use. In modem cordless telephones, the cradle 14 typically includes battery charging contacts, and sometimes other signal interface contacts. The docking station 2 also includes a variety of key actuators 12 that implement a conventional telephone keypad and other docking stations 2 features, which includes both an answering machine and a speakerphone in the illustrative embodiment. Such interface designs are understood by those skilled in the art. An antenna 10 is coupled to a transceiver (not shown) within the docking station 2 and is used for establishing a radio communications link between the cordless telephone handset (not shown) and the docking station 2. In an illustrative embodiment, a 900 MHz transceiver is employed, however, any suitable frequency of operation or signaling protocol as are understood by those skilled in the art may be used.

Figure 3A:
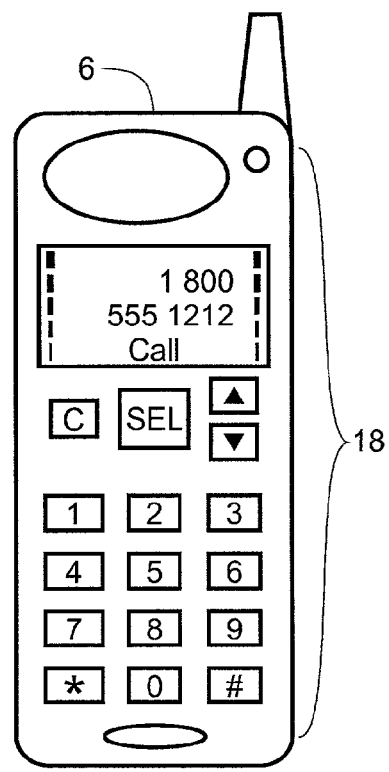
FIG. 3A is a drawing of a prior art wireless telephone.
Figure 3B:
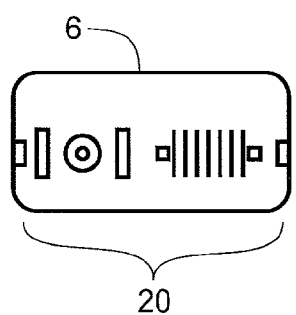
FIG. 3B is a drawing of the electrical interface of a prior art wireless telephone.

The present invention can be readily adapted to any number of different types of wireless telephones through use of a suitable cradle 16 interface design. By way of example and reference, and not for illustration of any limitations, FIGS. 3A and 3B illustrate an exemplar prior art wireless telephone suitable for interface to the present invention docking station. Most wireless telephones 6 share common characteristics. In FIG. 3A, which is a view of the user interface 18 of a wireless telephone 6. The user interface 18 includes an earphone speaker, a display, a group of function keys, a conventional telephone keypad, a microphone, a power switch, an antenna and other controls and interfaces as are understood by those skilled in the art. Such wireless telephones typically employ a menu selection interface of various wireless telephone functions, which typically includes a repertoire memory dialer. FIG. 3B illustrates the mechanical and electrical interface 20 of a typical wireless telephone 6. Wireless telephone manufacturers and suppliers do provide adjunct products designed to operate in conjunction with their wireless telephones. For example, headset/microphones are offered. So too are hands-free systems for use in motor vehicles, battery charging cradles, and interfaces for modems and other data ports. Such items are well understood by those of ordinary skill in the art. To meet the interface requirements of such adjunct devices, most prior art wireless telephone include an electrical interface, accessible from the exterior of the telephone, which presents the transmit and receive audio signals as well as a data interface and power supply connections. FIG. 3B illustrates such an interface. A typical wireless telephone interface 20 includes a coaxial power supply connector, typically used with a wall-jack transformer. But, there is also available separate power supply terminals that allow simple interface to cradle-type battery chargers and other mountable interfaces. The typical wireless telephone 6 also includes a bus-type connector that has a plurality of electrical conductors and may include transmit and receive audio signals, transmit and receive data signals, system ground, and system power supply signals. The interface protocol and specifications for such an interface can be obtained from the wireless telephone manufacturer either freely or through a licensing arrangement, or can be reverse engineered if necessary. Of course, different wireless telephones employ different physical interfaces, which may be of the form of a straight bus connector, for example.

Figure 4A:
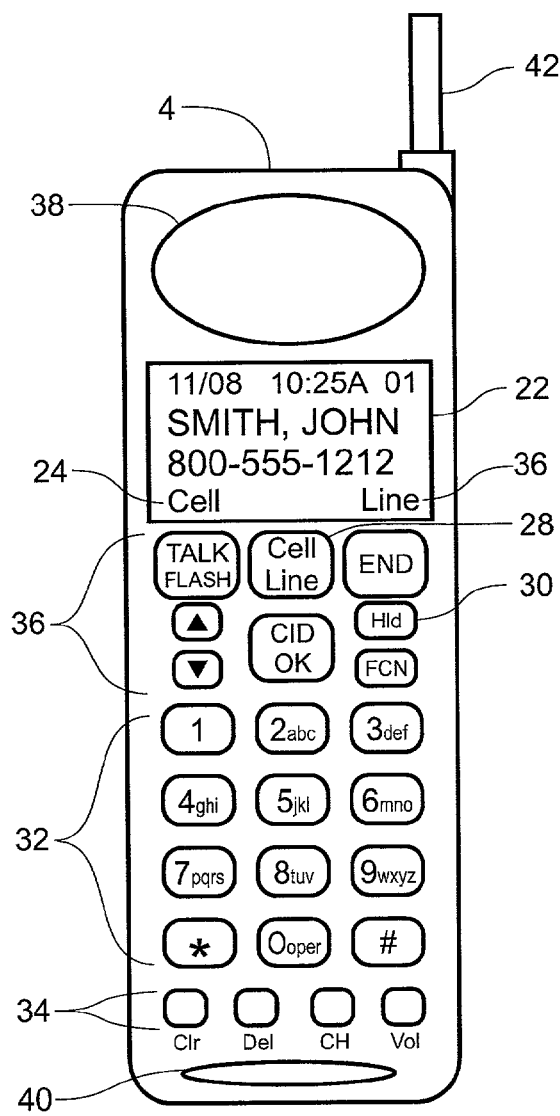
FIG. 4A is a drawing of the user interface of a cordless telephone in an illustrative embodiment of the present invention.
Figure 4B:
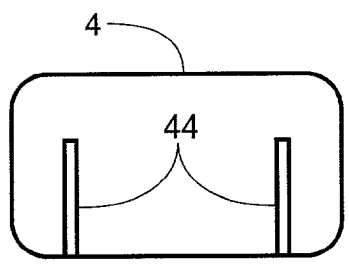
FIG. 4B is a drawing of the electrical interface of a cordless telephone in an illustrative embodiment of the present invention.

FIGS. 4A and 4B illustrate a cordless telephone 4 for use with present invention docking station. In FIG. 4A, the user interface on the front of the cordless telephone 4 is illustrated. An earphone speaker 38 and a display 22 are present along with a grouping of function keys 36. A conventional telephone keypad 32 is used as well as special function keys 34 and a microphone 40. Also, an antenna 42, which is coupled to an internal transceiver (not shown) that enables the cordless telephone 4 to communicate with the docking station transceiver through radio signal communications. Cordless telephones also typically include a repertoire memory dialer function, similar to the wireless memory dialer mentioned above. FIG. 4B illustrates the mechanical and electrical interface of the cordless telephone 4. The illustrative embodiment employs electrical contacts 44 for the purpose of battery charging and for detection of the on-hook condition. Other electrical interfaces can be used which include other signals, and perhaps a data transfer function so that the radio link is not used to transfer information to the cordless telephone 4. Such interfaces are understood by those of ordinary skill in the art. The physical dimensions of the base of the cordless telephone 4 define the mechanical interface.

The cordless telephone 4 depicted in FIG. 4A also illustrates certain user interface display and key actuators that are pertinent to the present invention. The display 22 includes a "Cell" indicator 24 and a "Line" indicator 28. The two indicators are alternatively activated or illuminated depending on whether the telephone resource currently coupled to the cordless telephone is the wireless telephone or the land-line interface respectively. A "Cell/Line" key actuator 28 is provided so that the user can select between the two telephone resources as required or desired. A hold "Hld" actuator 30 is provided so that one or the other of the telephone resources can be placed on hold while the other is coupled to the user interface for a conversation or other communications activity. The display 22 comprises a plurality of alpha-numeric digits that are used to display telephone numbers and text strings associated with various functions and telephone numbers. In particular, the display operates to display caller identification information ("Caller ID") on the display in advance of connecting the audio signals in any given call. The use and implementation of the Caller ID function in a cordless telephone handset is understood by those skilled in the art. The user interface key actuators are arranged in a key matrix and coupled to a handset controller (not shown). The display 22 is also coupled to the handset controller. The aforementioned handset transceiver is likewise coupled to the handset controller, with the earphone 38 and microphone 40 coupled to the transceiver for communications of audio signals.

Figure 5:
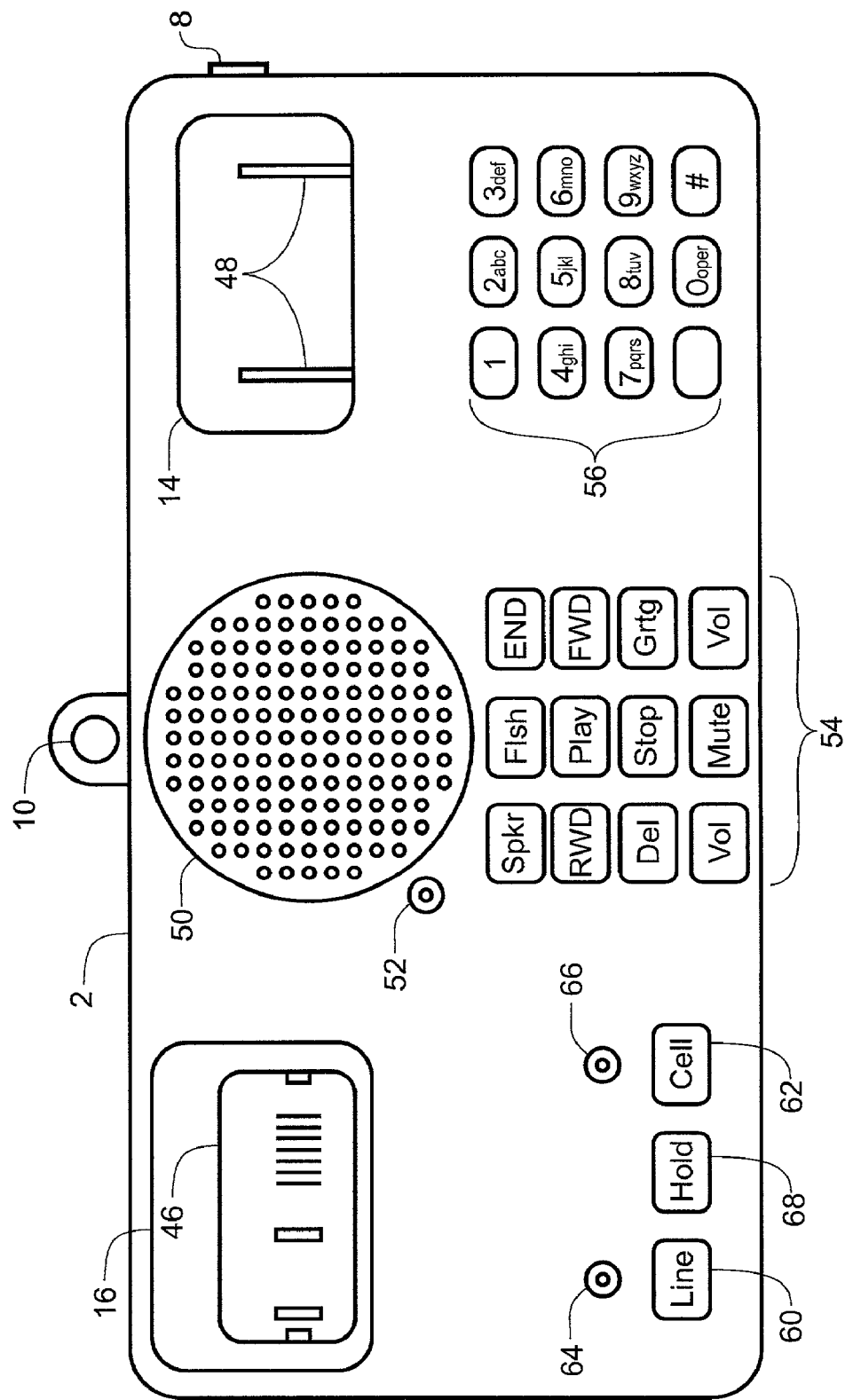
FIG. 5 is a drawing of the base unit in an illustrative embodiment of the present invention.

FIG. 5 is a detailed view of the user interface and top surface of the docking station 2 according to an illustrative embodiment of the present invention. The docking station 2 is formed from injection-molded plastic, or other suitable fabrication material and techniques, and houses various components of the device. As was discussed herein before, there is a cordless telephone cradle 14 that supports the cordless telephone (not shown) and provides battery charging current though electrical contacts 48, which align with mating electrical contacts on the bottom of the cordless telephone. A conventional telephone keypad 56 is disposed on the surface of the docking station 2. The keypad 56 comprises the usual digits zero through nine as well as the asterisk and pound keys, familiar to those or ordinary skill in the art. This keypad 56 enables the user to enter telephone numbers from the docking station 2 directly, thus avoiding the use of the cordless telephone and wireless telephone keypads mentioned above. In this regard, the docking station itself is a terminal device in a similar fashion as the cordless telephone handset when its speakerphone capability is employed. The docking station keypad 56 is of particular use when the speakerphone function is enabled, allowing the user to place a speakerphone originated call from the docking station 2 directly.

A speaker/microphone 50 is disposed upon the surface of the docking station 2. It is used in connection with the function key 54, which enables and disables the speakerphone function in the docking station 2. A speakerphone indicator 52 is provided to remind the user when the speakerphone is active. The basic operation of the speakerphone function will be discussed more fully hereinafter, but essentially, when a call is in progress and the speakerphone function is activated, the speaker phone is coupled to the transmit and receive audio from the wireless phone or the land line interface 8, and the user is able to communicate through whichever of the telephone resources is presently coupled. Various functions known to those skilled in the art are combined with the speakerphone operation and these include a "Spkr" speakerphone activation button, a "Flsh" flashhook button, an "END" key for terminating a call, a "Mute" button for muting the transmit audio from the speakerphone, and volume "Vol" controls. Since the docking station takes advantage of the dual telephone resources, the wireless telephone, through wireless cradle 16, and the land-line interface 8, there are telephone resource selection actuators and indicators employed so that the user can control the selection of telephone resources. A "Line" button 60 and a "Cell" button 62 are used to select between the land-line telephone resource and the wireless telephone resource respectively. A Line indicator 64 and a Cell indicator 66 are provided to remind the user of the presently selected telephone resource. A "Hold" button 68 is provided to place a first telephone resource on hold while the other resource is accessed in the case where both resources are simultaneously active.

Another telephone resource, a telephone answering machine, is also illustrated in FIG. 5. The loudspeaker 50 employed with the speakerphone function is also employed with the answering machine. The answering machine functions as a third telephone terminal unit in the illustrative embodiment together with the cordless telephone handset and the speakerphone. The answering machine is of conventional design generally, as is understood by those skilled in the art. The answering machine is coupled to either of the telephone resources and can send an out going message and receive and record incoming message. In the illustrative embodiment, the answering machine records and plays sound using digital audio encoding techniques understood by those skilled in the art. The controls for the answering machine are located in the user interface keypad 54. These controls include a greeting "Grtg" button that is used to record an outgoing message, or greeting. A "Play" button is provided for playing messages that have been received and recorded. To facilitate the selection of a message to play, a "RWD" rewind button and a "FWD" fast forward button are provided for scrolling through a list of recorded messages. An advantage of the present invention is the ability to route either of the telephone resources (the wireless telephone and the land-line interface) to the answering machine. This is particularly useful at times when the user is engaged in a conversation of a first telephone resource when a call is received on the other telephone resource. As will be discussed more fully hereinafter, the switching of calls is combined with the routing of caller identification information, used in conjunction with the call hold feature, to notify the user of incoming calls and allowing the user to select which call to accept, to hold, or to route to the answering machine.

The docking station 2 in FIG. 5 also illustrates the wireless telephone cradle 16 with the wireless telephone interface 46 therein. This interface 46 includes electrical connectors, which operate according to the design specification of the wireless device employed and the docking stations. The electrical interface 46 comprises signal conductors which include, but are not limited to, transmit audio, receive audio, transmit serial data, receive serial data, clock, data set ready, data terminal ready, power, ground, and other needed call progress interface signals. Those of ordinary skill in the art will appreciate the interface requirements, and realize the differences inherent in the various wireless telephones available.

Figure 6:
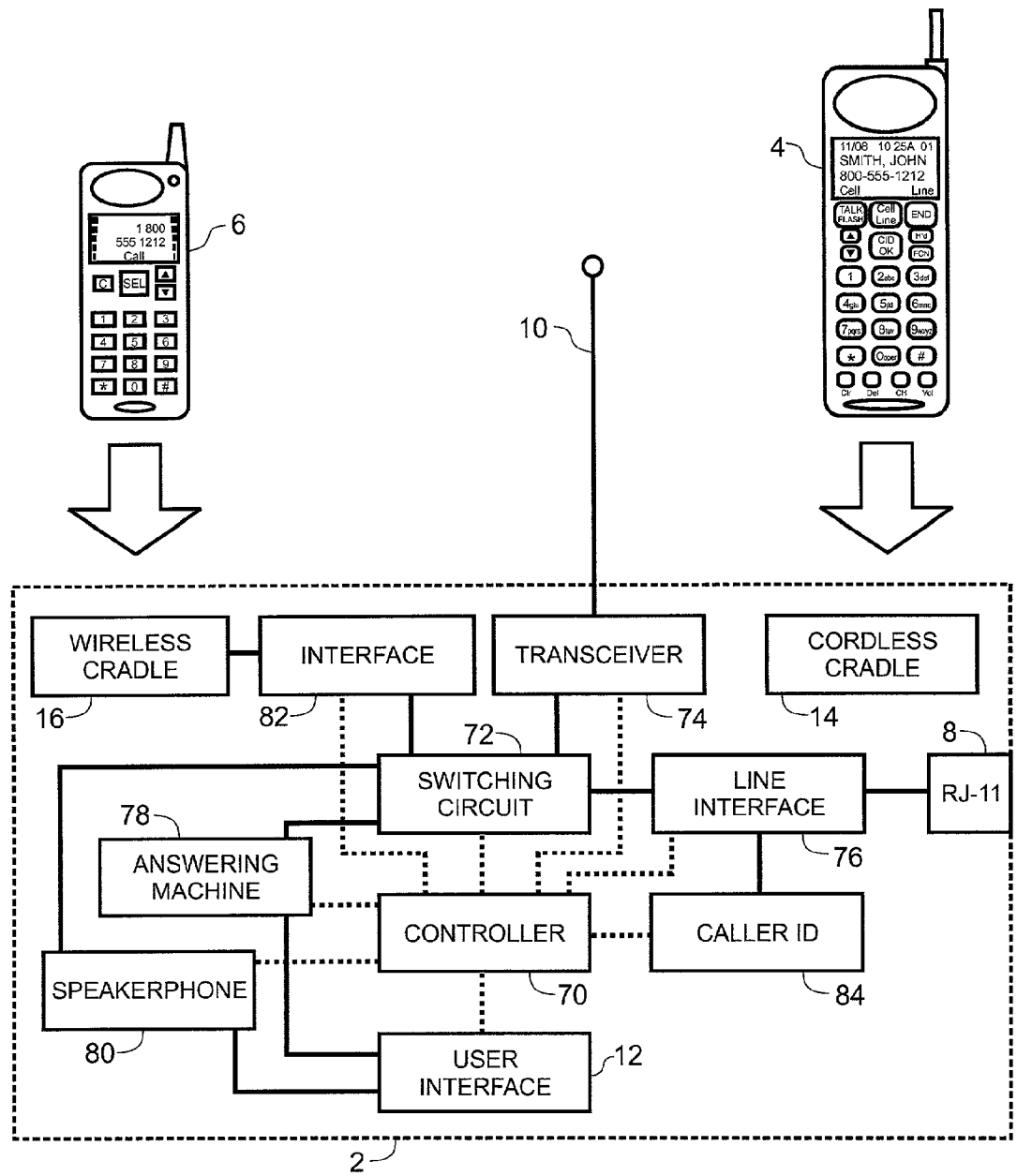
FIG. 6 is a functional block diagram of a wireless/cordless/landline docking station according to an illustrative embodiment of the present invention.

Reference is directed to FIG. 6, which is a functional block diagram of an illustrative embodiment of the present invention. The docking station 2 includes a wireless cradle 16 for accepting, supporting and interfacing to a wireless telephone 6. The wireless telephone 6 operates in conjunction with a conventional wireless telephone network and service provider and provides the function of a telephone resource to the docking station 2. The docking station also includes a cordless cradle 14 that serves to accept and support a cordless telephone 4. The cordless cradle 14 also provides charging current to the cordless telephone 4 through implementation of a power supply (not shown) and battery charging contact (not shown). The communications interface between the cordless telephone 4 and the docking station 2 is through an antenna 10 that is coupled to a transceiver 74 within the docking stations. In the illustrative embodiment, the transceiver 74 and a corresponding transceiver in the cordless telephone 4 operate in the 900 MHz radio band using digital signaling. The design of both transceivers in operation together enable communication of audio signals, data signals, and control signals between the cordless handset 4 and the docking station 2. The design of such transceivers are understood by those skilled in the art. The cordless handset functions as a telephone terminal unit in the illustrative embodiment.

The docking station also comprises an answering machine 78 and a speakerphone 80 that are both telephone terminal units in the illustrative embodiment. The docking station also comprises an RJ-11 telephone jack connector that couples to a telephone line interface circuit 76 that is a telephone resource in the illustrative embodiment. Telephone line interfaces are known to those skilled in the art and the interface 76 in the illustrative embodiment is of a conventional design. It is to be appreciated that the illustrative embodiment has two telephone resources (the wireless telephone 6 and land-line interface 8) and three telephone terminal units (the cordless handset 4, the answering machine 78, and the speakerphone 80). The coupling of audio, data, and control signals among the telephone resources and terminal units is accomplished by switching circuit 72. The structure of switching circuit 72 can be of a variety of electric circuit designs. The function can be electromechanical, semiconductor based, or of other switching technology known to those skilled in the art. The functions embodied in the switching circuit 72 can be distributed among numerous circuits within the docking station 2, of can be more tightly integrated, such as into a single integrated circuit of other computing device, including a digital signal processor, for example. Each of the aforementioned telephone resources and terminal units are coupled to the switching circuit 72. The switching of data and audio information is independently controlled and can be routed as required within the switching circuit. Independent switching is particularly important respecting the routing of caller identification information, which will be more fully discussed hereinafter.

The wireless telephone cradle 16 is coupled through a wireless interface circuit 82 which receives the raw audio and data signals output by the wireless telephone 6 and interfaces them in accordance with the internal signaling design requirements of the switching circuit 72. Thus, the wireless interface 82 is coupled to the switching circuit 72. The switching circuit 72 selectively switched these two telephone resources to the three telephone terminal units, which include the cordless telephone transceiver 74, the answering machine 78, and the speakerphone 80. The switching circuit 72 can also operate to switch data signals, which may be in synchronous or independent of the audio signals switched there through. Independent switching of signals is of particular utility when telephone call audio signals are routed differently than telephone call Caller ID data signals. The signaling levels and signal specification of each of the aforementioned interface circuits is matched so that the switching circuit can readily coupled each of the telephone resources to any of the telephone terminal units.

As the docking station processes telephone communications, the state of the switching circuit 72 is altered at the control of a controller 70. The controller is a computing device in the illustrative embodiment, which may be any of a variety of computers, processors, microcomputers, microprocessors, microcontrollers, signal processors or other suitable computing device known to those skilled in the art. The controller 70 is programmed to alter the switching state of the switching circuit 72 so that connections of audio signals among the aforementioned telephone resources and telephone terminal units may be accomplished from time to time according to the processes of the present invention. In addition to controlling the switching circuit 72, the controller 70 operates to control the speakerphone 80, the answering machine 78, the wireless telephone interface 82, the cordless transceiver 74, and the line interface 76 (shown as broken lines in FIG. 6). Thus, the controller 70 provides multiple functions within the docking station 2. Of course, the various functions of the controller 2 could readily be distributed among a plurality of controllers, as will be appreciated by those skilled in the art.

The illustrative embodiment of the present invention advantageously utilizes caller identification signaling available from most telephone service providers. This service is commonly called "Caller ID" service. To this end, a Caller ID circuit 84 is disposed within the docking station 2. The Caller ID circuit 84 serves to monitor telephone call progress signals on the telephone line coupled to RJ-11 jack 8 then detects and forwards Caller ID information to the controller 70. Similarly, the wireless telephone 6 may be enabled to receive Caller ID information from the wireless telephone service provider and this information is coupled in the docking station 2 through the wireless cradle 16 and wireless interface 82 to the controller 70. Therefore, the controller 70 can receive Caller ID information from time to time from both of the telephone resources. The cordless telephone 4 of the illustrative embodiment comprises a display and is operable to display Caller ID information, as was discussed herein before. The controller operates to receive Caller ID information from either of the telephone resources and communicates this information to the cordless headset, where it is displayed for user review. The illustrative embodiment employs two basic modes of Caller ID functionality. First, during an idle state of operation, if a telephone call is received from either telephone resource, the controller 70 monitors and receives the associated Caller ID signaling and forwards this information to the cordless handset 4 through cordless transceiver 74, together with an indication, sent as data or control signals, of the particular resource from which the incoming call is received. The cordless handset 4 then displays the Caller ID information while at the same time activating the appropriate telephone source indicator. In one mode of operation, the controller 70 also sets the state of the switching circuit 72 to couple the incoming call to the cordless transceiver so that the user can immediately receive the call by actuating a control (typically the "Talk" button) on the cordless handset 4 user interface. Alternatively, the user may decline to accept the call by doing nothing to answer it. In this case, the controller automatically routes the call to the answering machine 78 after a predetermined number of telephone rings have occurred. This is accomplished in the controller 70 by changing the state of switching circuit 72 to couple the incoming call to the answering machine, while simultaneously activating the answering machine outgoing message and subsequent processes. The design, function and operation of answering machines are well understood by those skilled in the art. The second basic mode of Caller ID functionality is when a call is received on one of the telephone resources while the docking station is engaged on another call through the other telephone resource. In this case, the switching circuit 72 is in a state that couples the active telephone resource to the cordless handset 4. A call arrives on the second telephone resource and the controller 70 receives the Caller ID information for the second call. The Caller Id information is routed to the cordless handset as data through the cordless transceiver, and is then displayed on the display of the cordless telephone. There can also be a selectable tactile or audible notification generated in the cordless handset 4 to alert the use to view the display. The cordless display activates the display indicator that identifies the telephone source of the second call at the same time the Caller ID information is displayed. At this time, the user can ignore the incoming call, which will route the call to the answering machine, or the user can respond to the incoming call. A suitable response by the user would be to place the first call on hold by pressing the "Hld" actuator on the cordless telephone 4 user interface and then answer the second call by selecting the second resource. Once in this mode of operation, the cordless handset operates in a manner consistent with a typical two-line cordless telephone system, as are understood by those skilled in the art.

The docking station is also operable as a speakerphone through operation of the speakerphone circuits 80 and software within the docking station 2. The speakerphone function can be activated at the time a call is originated or initially answered, and the speakerphone function can be activated during the process of an ongoing call. When the speakerphone function is activated, the switching circuit 72 state is changed by the controller 70 to couple a present call state from the cordless telephone 4 to the speakerphone circuit 80. Caller ID information is routed to the cordless telephone 4 display during a speakerphone call, as it is assumed that the cordless telephone 4 will be docked in the cordless cradle 14 and visible to the user. In an alternative embodiment, there may be a Caller ID display disposed upon the docking station 2 that is coupled to the controller 70 for display of Caller ID and telephone resource information.

Figure 7:
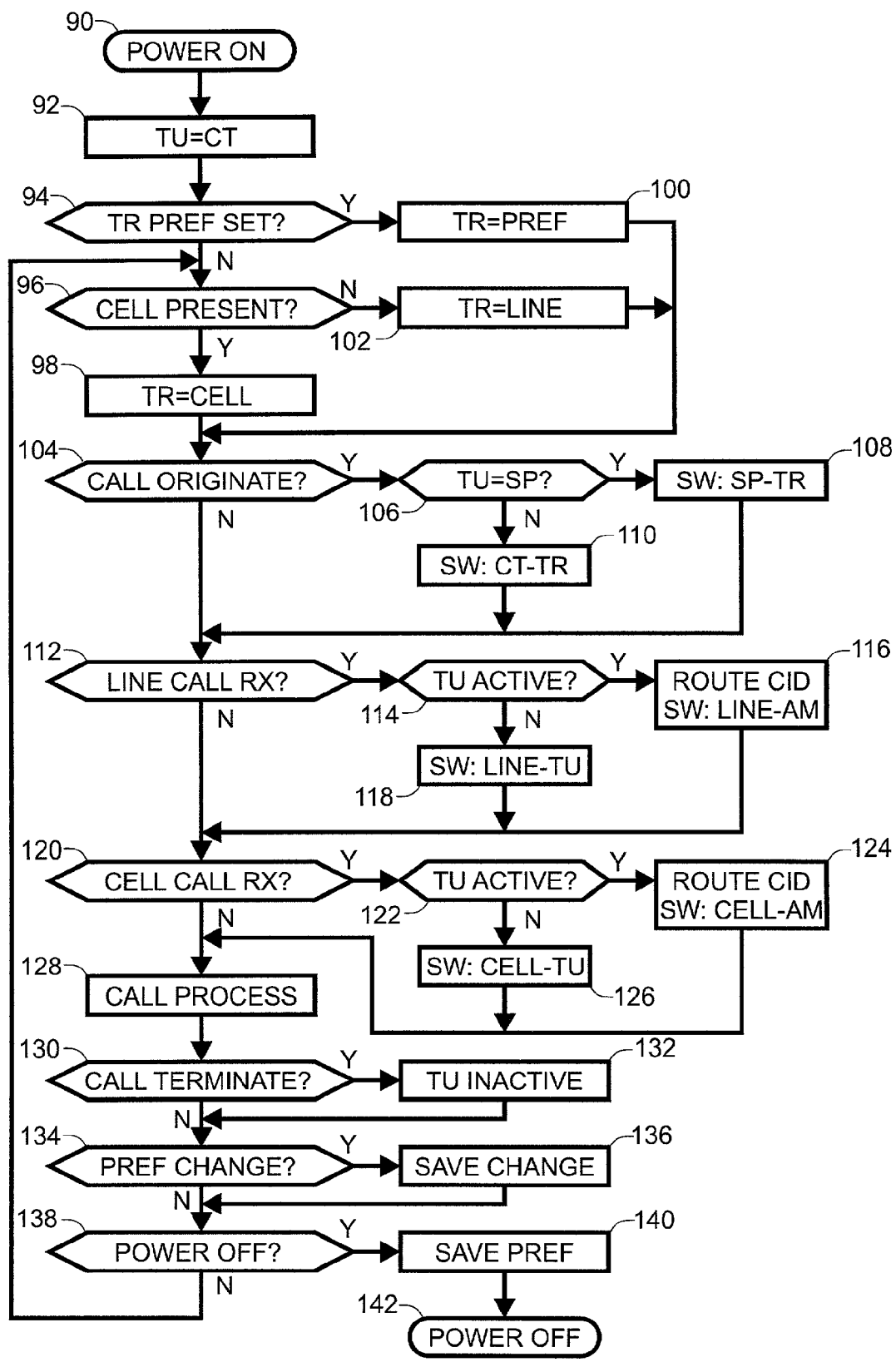
FIG. 7 is a flow diagram of an illustrative embodiment of the present invention.

Reference is directed to FIG. 7, which is a process flow diagram of an illustrative embodiment of the present invention. The process begins at step 90 when the docking station power is turned on. The system is initialized by setting the present terminal unit ("TU") to be the cordless telephone ("CT") at step 92. The controller checks a memory in the docking station at step 94 to determine if the user has set a telephone resource ("TR") preference. For example, the user may select the wireless telephone or the land-line interface to be the default telephone resource. If a preference is found at step 94, then the process sets the present telephone resource equal to the recalled preference at step 100. Otherwise, at step 94 if no telephone resource preference has been selected, the process tests to determine if the wireless telephone ("Cell") is present at step 96. In the illustrative embodiment, the default telephone resource is the wireless telephone if the user has not made an alternative telephone resource preference choice. If the wireless telephone is not present in the wireless telephone cradle at step 96, then the telephone resource is set to the land-line interface ("Line") at step 102. On the other hand, at step 96, if the wireless telephone is present, the telephone resource is set to the wireless telephone at step 98. Having set the present telephone resource at one of steps 100, 102, or 98, and, having set the present terminal unit at step 92, the switching circuit is thus set to the idle condition awaiting some action and flow proceeds to step 104. A main process loop is circulated through between steps 96 through 138 that embodies the operation function of the illustrative embodiment docking station.

In the main process loop, at step 104, the controller tests to see if the user is originating a telephone call. If the user has not originated a call, flow proceeds through the main process loop from step 104. On the other hand, if the user has initiated a call at step 104, then a test is made at step 106 to determine if the user has activated the speakerphone function ("SP") at step 106. The speakerphone is an alternative terminal unit, and if the speakerphone has been activated at step 106, the switch state ("SW") is set for connect the speakerphone to the present telephone resource at step 108. On the other hand, at step 106, if the speakerphone has not been activated, the switch state is set to couple the cordless telephone to the presently set telephone resource at step 110. The call is then processed until another event occurs within the main process loop.

Another event in the main process loop may be the receipt ("RX") of a land-line telephone call at step 112. If no land-line call has been received at step 112, flow continues through the main process loop. On the other hand, if a land-line call is received at step 112, then a test is made at step 114 to determine if the presently selected terminal unit is active, which implies that another call is presently in process. If the present terminal unit is not active, then the switch state is set to connect the land-line interface to the present terminal unit at step 118. On the other hand, if the present terminal unit is active at step 114, then the Caller ID ("CID") information from the land-line call is routed to the cordless handset at step 116 and the switch state is set to coupled the incoming land-line call to the answering machine ("AM") at step 116. The wireless call also remains coupled to the present terminal unit. The docking station is thus processing two difference telephone calls.

Another event in the main process loop may be the receipt of a wireless telephone call at step 120. If no wireless call has been received at step 120, flow continues through the main process loop. On the other hand, if a wireless call is received at step 120, then a test is made at step 122 to determine if the present terminal unit is active, meaning that another call is presently in process. If the present terminal unit is not active, then the switch state is set to connect the wireless interface to the present terminal unit at step 126. On the other hand, if the present terminal unit is active at step 122, then the Caller ID information from the wireless call is routed to the cordless handset at step 124 and the switch state is set to couple the incoming wireless call to the answering machine at step 116. The land-line call also remains coupled to the present terminal unit.

In the event a call is in process in the process loop, the controller processes the call at step 128. This step embodies a wide variety of activities known in the telephony arts. It involves monitoring call progress so that various call signaling events are properly responded to and user input actuations pertinent to call progress are properly handled. At step 130 in the main process loop, the controller test to determine it a call has been terminated. If not, flow continues through the main process loop. On the other hand, at step 130, if a call has terminated, the terminal unit engaged in that call is set to a inactive state so that subsequent functions will be able to determine this fact. At step 134, a test is made to determine if the user has made any preference changes. If the user has made preference changes, these changes are saved in a memory in the docking station at step 136. In either case, flow continues to step 138. Step 138 test to determine if the user has turned the power off, which is a software command in the illustrative embodiment as opposed to an actual disconnect form the docking station power source. If the user has turned off the power at step 138, the present preferences are saved at step 140 and the power source is disconnected at step 142. On the other hand at step 138, if the user has not turned of the power, then flow recirculates through the aforementioned processes, waiting for the various events to occur.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. A telephone docking station for coupling signals among a wireless telephone, a cordless telephone handset and a metallic telephone line, comprising:
   a multiple port telephone switch;
   a wireless telephone interface adapted to receive the wireless telephone and to couple wireless signals with a first port on said switch, said wireless telephone interface having an output state indicative of the presence of the wireless telephone;
   a cordless telephone base unit having a radio transceiver adapted to communicate with the cordless telephone handset and adapted to couple cordless signals with a second port on said switch;
   a telephone line interface adapted to interface with the metallic telephone line and to couple line signals with a third port on said switch, and
   a controller coupled to said output, and coupled to control said switch to connect said first port or said second port to said third port as a function of the state of said output;
   a cordless handset operable to communicate data signals with said cordless telephone base unit, said cordless handset having an actuator and operable to encode a control signal in said data signals in response to actuation of said actuator, and wherein
   said radio transceiver is coupled to receive said control signal from said cordless handset and operable to communicate said control signal to said controller, and wherein
   said controller controls said switch to connect either of said first port or said third port to said second port in accordance with said control signal, and wherein
   said cordless handset further comprises a display indicator for indicating which of said ports are connected in said switch, and wherein
   said controller is operable to generate a switch state signal within said data signals and cause said cordless telephone base unit to communicate said switch state signal to said cordless handset, and wherein
   said cordless handset is operable to drive said display in accordance with said switch state signal.

2. The apparatus of claim 1 and wherein said controller controls said switch to connect said first port to said second port if said output state indicates that the wireless telephone is present, or, said controller controls said switch to connect said third port to said second port if said output state indicates that the wireless telephone is not present.

3. The apparatus of claim 1 further comprising:
   an actuator coupled to said controller, and wherein
   said controller controls said switch to connect either of said first port or said third port to said second port in accordance with actuation of said actuator.

4. The apparatus of claim 1, further comprising:
   a display indicator for indicating which of said ports are connected in said switch, and wherein
   said controller is coupled to drive said display indicator in accordance with the current connection state of said switch.

5. The apparatus of claim 1 further comprising:
   a display disposed within said cordless handset having a Caller ID display portion and a call indicator for indicating the source of a telephone call, and wherein
   said controller is operable to receive Caller ID data from either of said wireless telephone interface adapter or said telephone line interface, and operable to couple said Caller ID data together with data indicative of the source of said Caller ID data to said cordless telephone base unit for communications thereof to said cordless handset for display of said Caller ID data on said display and for activation of said call indicator indicative of the source of said Caller ID data.

6. The apparatus of claim 1 further comprising:
   a second actuator disposed upon said cordless handset for answering an incoming call, and wherein
   actuation of said second actuator causes said cordless handset to communicate a answer signal to said cordless telephone base unit that couples said answer signal to said controller, and wherein
   said controller is operable to cause said multiple port switch to coupled to presently ringing one of said wireless telephone interface or said telephone line interface to said second port in response to said answer signal.

7. The apparatus of claim 1, further comprising:
   a speakerphone adapted to couple speakerphone signals with a fourth port on said switch;
   an actuator coupled to said controller for selecting a speakerphone function, and wherein selection of said speakerphone function causes said controller to control said switch to connect said fourth port in place of said second port, thereby connecting the presently connected one of said wireless signals or said line signals to said speakerphone signals.

8. The apparatus of claim 1, further comprising:

an answering machine adapted to couple answering machine signals with a fourth port on said switch, and wherein said controller is operable to control said switch to connect either of said first port or said third port to said fourth port upon receipt of an answering machine command identifying which of said first of third ports are to be coupled to said fourth port.

9. The apparatus of claim 8 wherein said controller is operable to produce said answering machine command indicating that said first port is to be coupled to said fourth port if said cordless telephone base unit is presently engaged in a telephone call.

10. The apparatus of claim 8 wherein said controller is operable to produce said answering machine command indicating that said third port is to be coupled to said fourth port if said wireless telephone interface is presently engaged in a telephone call.

* * * * *